US008630355B2

(12) United States Patent
Oguz (10) Patent No.: US 8,630,355 B2
(45) Date of Patent: Jan. 14, 2014

(54) MULTIMEDIA DATA REORGANIZATION BETWEEN BASE LAYER AND ENHANCEMENT LAYER (75) Inventor: Seyfullah Halit Oguz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1580 days.

(21) Appl. No.: 11/777,918

(22) Filed: Jul. 13, 2007

(65) Prior Publication Data

US 2008/0152003 A1 Jun. 26, 2008

Related U.S. Application Data (60) Provisional application No. 60/871,642, filed on Dec. 22, 2006.

(51) Int. Cl.
*H04N 7/12* (2006.01)

(52) U.S. Cl.
USPC .......... 375/240.26; 375/240; 375/240.01; 375/240.1; 375/240.02; 375/240.05; 375/240.12; 375/240.15

(58) Field of Classification Search
USPC ..................................... 375/240.26
See application file for complete search history.

(56) References Cited

U.S. PATENT DOCUMENTS

| 6,501,797 | B1* | 12/2002 | van der Schaar et al. ............ 375/240.12 |
| 6,996,172 | B2* | 2/2006 | Ishtiaq et al. .............. 375/240.1 |
| 7,292,165 | B2* | 11/2007 | Cha et al. ....................... 341/107 |
| 7,583,730 | B2* | 9/2009 | Wu et al. ................... 375/240.12 |
| 7,606,303 | B2* | 10/2009 | Nemiroff et al. ......... 375/240.01 |
| 2002/0150158 | A1* | 10/2002 | Wu et al. .................. 375/240.12 |
| 2003/0118096 | A1* | 6/2003 | Ishtiaq et al. .............. 375/240.1 |
| 2005/0089105 | A1* | 4/2005 | Zhang et al. ............. 375/240.27 |
| 2005/0135477 | A1* | 6/2005 | Zhang et al. ............. 375/240.08 |
| 2005/0147164 | A1* | 7/2005 | Wu et al. .................. 375/240.12 |
| 2005/0190834 | A1* | 9/2005 | Wu et al. .................... 375/240.1 |
| 2005/0195895 | A1* | 9/2005 | Wu et al. .................... 375/240.1 |
| 2005/0286634 | A1* | 12/2005 | Duvivier ................. 375/240.16 |

(Continued)

FOREIGN PATENT DOCUMENTS

| JP | 2001223665 A | 8/2001 |
| WO | 0147283 | 6/2001 |
| WO | 2006119436 | 11/2006 |

(Continued)

OTHER PUBLICATIONS

International Search Report—PCT/US07/087998—International Search Authority, European Patent Office—Jul. 4, 2008.

(Continued)

*Primary Examiner* — Edan Orgad
*Assistant Examiner* — Canh Le
(74) *Attorney, Agent, or Firm* — Fulbright & Jaworski LLP (57) ABSTRACT This disclosure describes techniques for allocating and reallocating multimedia data between a base layer and an enhancement layer defined in a wireless modulation scheme. The reallocation techniques may vary depending on whether bidirectional predictive (B) frames were originally allocated to the base layer, and whether a re-encode request has been issued to encoders, e.g., to reduce the encoding rate to meet bandwidth constraints associated with a wireless communication channel. The described techniques may help to efficiently utilize channel resources, balance bandwidth between channels and possibly improve error resilience at the application layer. In some cases, the techniques can help to reduce overall aggregate bandwidth usage.

56 Claims, 4 Drawing Sheets

(56) References Cited

U.S. PATENT DOCUMENTS

| | | |
|---|---|---|
| 2006/0232454 A1 | 10/2006 | Cha et al. |
| 2007/0121719 A1* | 5/2007 | Van Der Schaar et al. 375/240.1 |
| 2007/0274388 A1* | 11/2007 | Lee et al. ................. 375/240.13 |
| 2008/0043832 A1* | 2/2008 | Barkley et al. ................ 375/240 |
| 2008/0144723 A1* | 6/2008 | Chen et al. ............... 375/240.26 |

FOREIGN PATENT DOCUMENTS

| | | |
|---|---|---|
| WO | WO0165848 | 9/2001 |
| WO | WO03049449 A2 | 6/2003 |

OTHER PUBLICATIONS

Written Opinion—PCT/US07/087998—International Search Authority, European Patent Office—Jul. 4, 2008.

Schierl T., et al., "Wireless broadcasting using the scalable extension of H.264/AVC," Multimedia and Expo, 2005. ICME 2005. IEEE International Conference on Jul. 6, 2005, pp. 884-887.

"Joint Scalable Video Model (JSVM) 8," Joint Video Team of ISO/IEC MPEG & ITU-T VCEG, 21st Meeting: Hangzhou, Cina, No. JVT-U202, Dec. 13, 2006.

\* cited by examiner

MULTIMEDIA DATA REORGANIZATION BETWEEN BASE LAYER AND ENHANCEMENT LAYER

This application claims the benefit of U.S. Provisional Application No. 60/871,642, filed on Dec. 22, 2006, the entire content of which is incorporated herein by reference.

TECHNICAL FIELD

The disclosure relates to multimedia coding and wireless communication of coded multimedia content.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players and the like. Digital multimedia devices may implement video coding techniques, such as MPEG-2, MPEG-4, or H.264/MPEG-4 Part 10, Advanced Video Coding (AVC), to transmit and receive or store and retrieve digital video data more efficiently. Video coding techniques may perform video compression via spatial and temporal prediction to reduce or remove redundancy inherent in video sequences.

In video coding, the compression often includes spatial prediction, motion estimation and motion compensation based temporal prediction, and transform coding. Intra-coding relies on spatial prediction and transform coding to reduce or remove spatial redundancy between video blocks within a given video frame. Inter-coding relies on temporal prediction and transform coding to reduce or remove temporal redundancy between video blocks of successive video frames of a video sequence. Intra-coded frames ("I frames") are often used as random access points as well as references for the inter-coding of other frames. I frames, however, typically exhibit less compression than other frames.

For inter-coding, a video encoder performs motion estimation to track the movement of matching video blocks between two or more adjacent frames. Inter-coded frames include predictive frames ("P frames"), which include blocks predicted from previous frames, and bidirectional predictive frames ("B frames"), which include blocks predicted from previous and subsequent frames of a video sequence. For P and B frames, motion estimation generates motion vectors, which indicate the displacement of video blocks relative to corresponding prediction video blocks in reference frames. Motion compensation uses the motion vectors to generate prediction video blocks from a reference frame. After motion compensation, a residual video block is formed by subtracting the prediction video block from the original video block to be coded. The video encoder usually applies transform, quantization and transform coefficient coding processes to further reduce the bit rate associated with communication of the residual block. I and P frames are commonly used to define reference blocks for the inter-coding of P and B frames, and in some cases, particular B frames (referred to as BR frames) can be used as references for other B frames.

Some video coding makes use of scalable techniques. For example, scalable video coding (SVC) refers to video coding in which a base layer and one or more scalable enhancement layers are used. For SVC, a base layer typically carries multimedia data with a base level of quality. One or more enhancement layers carry additional multimedia data to support higher spatial, temporal and/or SNR quality levels. As an example, the base layer may be transmitted in a manner that is more reliable than the transmission of enhancement layers. Enhancement layers may add spatial resolution to frames of the base layer, or may add additional frames to increase the overall frame rate. In one example, the most reliable portions of a modulated signal may be used to transmit the base layer, while less reliable portions of the modulated signal may be used to transmit the enhancement layers.

SVC may be used in a wide variety of video coding applications. One particular area where SVC techniques are commonly used is in wireless multimedia broadcast applications. Multimedia broadcasting techniques include those referred to as Forward Link Only (FLO), Digital Multimedia Broadcasting (DMB), and Digital Video Broadcasting-Handheld (DVB-H). Wireless digital multimedia broadcasting may deliver content to many subscriber devices as a series of broadcast channels, providing a multimedia content selection experience similar to that of a conventional television. Each broadcast channel carries digital data comprising encoded audio/video streams, audio/video clips, or other informational content. The digital broadcast channels are delivered simultaneously on a multicast basis to multiple mobile wireless subscriber units (such as mobile handsets or so-called multimedia "cell phones"). Each mobile wireless subscriber unit receives the digital broadcast, and may tune to a particular broadcast channel for presentation to the user. To switch broadcast channels, a respective wireless apparatus acquires the digital data from a different broadcast channel and decodes the data to present the different content associated with that broadcast channel to the user.

SUMMARY

This disclosure describes techniques for allocating and reallocating multimedia data between a base layer and an enhancement layer defined in a wireless modulation scheme. Various transmit modes, such as some of those provisioned by the "FLO Air Interface," enable the concurrent transmission of two different information flows. These different information flows can be viewed as virtual wireless "channels" at the application layer that define a base layer channel and an enhancement layer channel. The base layer channel is of a higher quality in terms of reliability of the wireless transmission.

This disclosure proposes many ways to allocate and reallocate multimedia data between the base layer and the enhancement layer in order to efficiently utilize channel resources, balance bandwidth between channels and possibly improve error resilience at the application layer. The reallocation of multimedia data between base layer and enhancement layer may vary depending on whether bidirectional predictive (B) frames were originally allocated to the base layer, and whether a re-encode request has been issued to encoders, e.g., to reduce the encoding rate to meet bandwidth constraints.

In one example, a method comprises allocating multimedia data between a base layer and an enhancement layer defined in a wireless modulation scheme, analyzing the allocation of the multimedia data between the base layer and the enhancement layer, reallocating the multimedia data between the base layer and the enhancement layer based on the analysis, and transmitting the reallocated multimedia data in the base layer and the enhancement layer of the wireless modulation scheme.

In another example, an apparatus comprises an encoder module that allocates multimedia data between a base layer and an enhancement layer defined in a wireless modulation scheme, a reallocation module that analyzes the allocation of multimedia data between the base layer and the enhancement layer and reallocates the multimedia data between the base layer and the enhancement layer based on the analysis, and a transmitter that transmits the reallocated multimedia data in the base layer and the enhancement layer according to the wireless modulation scheme.

In another example, a device comprises means for allocating multimedia data between a base layer and an enhancement layer defined in a wireless modulation scheme, means for analyzing the allocation of the multimedia data between the base layer and the enhancement layer, means for reallocating the multimedia data between the base layer and the enhancement layer based on the analysis, and means for transmitting the reallocated multimedia data in the base layer and the enhancement layer of the wireless modulation scheme.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution cause at least one computer to allocate multimedia data between a base layer and an enhancement layer defined in a wireless modulation scheme, analyze the allocation of the multimedia data between the base layer and the enhancement layer, reallocate the multimedia data between the base layer and the enhancement layer based on the analysis, and transmit the reallocated multimedia data in the base layer and the enhancement layer of the wireless modulation scheme.

In some cases, the computer-readable medium may form part of a computer program product, which may be sold to manufacturers and/or used in a video coding device. The computer program product may include the computer-readable medium, and in some cases, may also include packaging materials.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes techniques for allocating and reallocating multimedia data between a base layer and an enhancement layer defined in a wireless modulation scheme. The term "multimedia data" generally refers to video or audio-video data. Various transmit modes, such as some of those provisioned by the "FLO Air Interface," may enable the concurrent transmission of two or more different information flows. These different information flows may be defined at the application layer with respect to a physical layer modulation scheme, and can be viewed as virtual wireless "channels" that define a base layer channel and an enhancement layer channel. The base layer channel is of a higher quality in terms of reliability of the wireless transmission.

This disclosure proposes many ways to allocate and reallocate multimedia data between the base layer and the enhancement layer. The reallocation techniques may vary depending on whether bidirectional predictive (B) frames were originally allocated to the base layer, and whether a re-encode request has been issued to encoders, e.g., to reduce the encoding rate to meet bandwidth constraints associated with a wireless communication channel. The described techniques may help to efficiently utilize channel resources, balance bandwidth between channels and possibly improve error resilience at the application layer. In some cases, the techniques can help to reduce overall aggregate bandwidth usage.

A current revision of the FLO Air Interface specification defines wireless modulation according to a hierarchical signal constellation that resembles that of a 16-QAM (16 point (4 bit) quadrature amplitude modulation) signal. The constellation defines four points in each of the four different quadrants yielding a total of 16 points. Each point corresponds to a vector space representation of the corresponding modulated carrier signal and can be represented by a 4 bit binary number. Through constellation design (choice of modulation parameters), two points of each quadrant may have higher quality than the other two points of that quadrant, in terms of the reception reliability in the wireless transmission. That is, two of the bits defined by the four-bit binary numbers that identify which quadrant the corresponding point lays in, are of higher quality than the remaining two bits that point to one of the four points of that particular quadrant, in terms of their correct reception reliability in the wireless transmission. The higher quality bits of the 16-QAM signal may be used to define a base layer and the lower quality bits may be used to define an enhancement layer. Regardless of the content that is allocated to the base layer and the enhancement layer, all of the bits are transmitted in the wireless communication. Accordingly, if there is more data in the base layer, conventionally, padding bits are added in the enhancement layer.

This disclosure proposes techniques that make better use of this "unused" bandwidth in the enhancement layer, e.g., by reallocating multimedia data between the base layer and the enhancement layer. In various scenarios, data associated with B frames (or "low priority" B frames) may be moved from the base layer to the enhancement layer in order to achieve a better balance of multimedia data between the different layers. Also, multimedia data in the base layer may be coded redundantly in the enhancement layer, or assistance information may be defined in the enhancement layer to aid and assist in decoding and thereby make better use of unused bandwidth. In still other cases, portions of predictive (P) frames may be moved from the base layer to the enhancement layer. Such portions, for example, may comprise the lowest priority P frame information defined according to a slice data partitioning scheme. In some cases, when multimedia data is moved from the base layer to the enhancement layer, redundant coding of such frames may be performed in the enhancement layer. These different techniques may apply in different scenarios, e.g., based on factors such as whether B frames were originally allocated to the base layer and whether a re-encode request has been issued to encoder.

Figure 1:
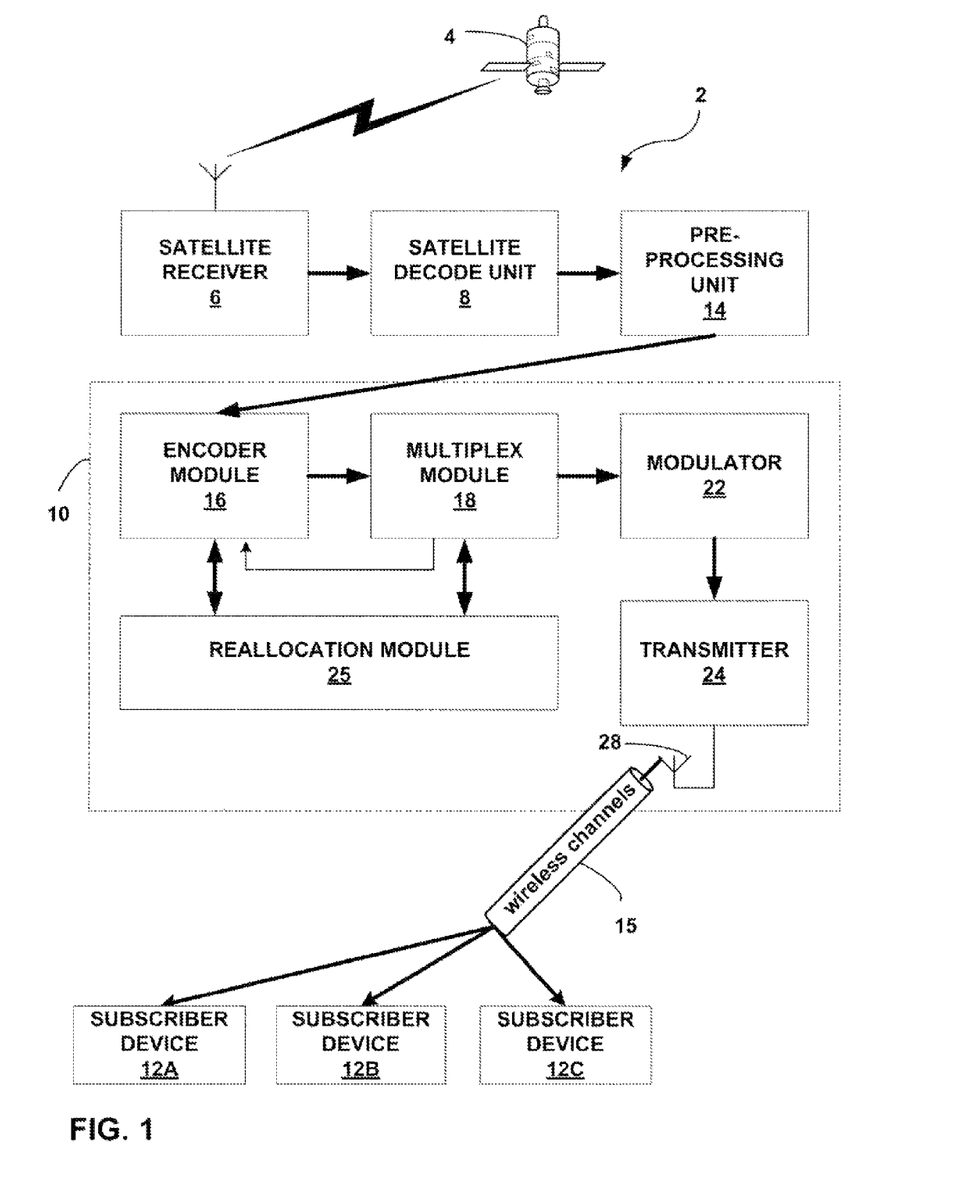
FIG. 1 is a block diagram illustrating an exemplary data coding and communication system that can make use of the techniques of this disclosure.

FIG. 1 is a block diagram illustrating an exemplary system 2 that can make use of the techniques of this disclosure. System 2 is merely exemplary as many other systems could also make use of the techniques described herein. System 2 in an example of a system that supports wireless broadcasting of multimedia content from an encoding device 10 to multiple subscriber devices 12A-12C. The techniques of this disclosure are particularly useful to such broadcast systems, but could also apply to systems that support two-way wireless communication of video information, such as systems that support video telephony or other systems that support video coding and communication of video information such as on-demand point-to-point video streaming services.

Multimedia broadcasting techniques include those referred to as Forward Link Only (FLO), Digital Multimedia Broadcasting (DMB), and Digital Video Broadcasting-Handheld (DVB-H). Digital multimedia broadcasting may deliver content to many subscriber devices 12A-12C as a series of broadcast channels, providing a multimedia content selection experience similar to that of a conventional television. Each broadcast channel carries digital data comprising encoded audio/video streams, audio/video clips, or other informational content. The digital broadcast channels are delivered simultaneously on a multicast basis from device 10 to multiple subscriber devices 12A-12C. Subscriber devices 12A-12C may comprise mobile wireless subscriber units (such as mobile handsets or so-called multimedia "cell phones"). Each of mobile wireless subscriber units 12A-12C receives the digital broadcast, and may tune to a particular channel for presentation to the user. In order to switch channels, a respective subscriber unit acquires the digital data from a different channel and decodes the data to present the different content to the user.

Again, system 2 is merely exemplary. The techniques described herein could be used in any system that uses a wireless modulation scheme that defines two or more layers. The different layers (base layer and enhancement layer) may be viewed as virtual channels in some cases. Other exemplary systems may use direct two-way wireless communication (rather than broadcasting), or may communicate between two or more devices via base stations or other system components. For example, in other examples the techniques of this disclosure may be used by devices that perform video coding for video conferencing or other video telephony applications.

In system 2, a satellite transmitter 4 transmits many broadcast channels to a satellite receiver 6. The information in the different broadcast channels is decoded by satellite decode unit 8, and then preprocessed by pre-processing unit 14. Pre-processing unit 14 may facilitate resolution and format changes e.g., from standard definition to Quarter Video Graphics Array (QVGA) and/or from interlaced to progressive scan, in order to create video content in a format that is more useful for wireless broadcast. In one example, components 4, 6 and 8 may comprise conventional equipment for broadcasting and decoding satellite television. In other cases, however, broadcast channels of multimedia content could be provided by a cable television provider, or any other source. Pre-processing unit 14 generally processes the multimedia content into a format useful for wireless broadcast.

Device 10 facilitates the wireless broadcasting of the multimedia content. Device 10 may include an encoder module 16 that encodes channels of multimedia content. Encoder module 16 may comprise a single module, or may comprise several different encoder modules that handle different channels of multimedia content. For example, encoder module 16 may encode a plurality of different services or content that includes one or more flows of multimedia data. Multiplex module 18 may combine the encoded flows into a multicast. The encoded channels may include multimedia content or services such as news, sports, weather, financial information, movies, and/or applications, programs, scripts, or any other type of suitable content or service. In one aspect of this disclosure, device 10 encodes, combines, and transmits portions of the flows of multimedia data received over a period of time.

As an example, device 10 may operate on the flows on a per second basis. As an example, device 10 may encode one-second segments of multimedia data of the plurality of flows or channels, combine the one-second segments of multimedia data to form a superframe of data, and transmit the superframe over wireless channels 15 via a transmitter 24. As used herein, the term "superframe" refers to a group of segments of multimedia data collected over a time period or window, such as a one second time period or window. The segments of multimedia data may include one or more frames of video or audio-video data. Although various aspects of this disclosure may be described in the context of one-second segments of data, the techniques may also be utilized for combining and transmitting other segments of data, such as for segments of data received over a different period of time, that may or may not be a fixed period of time, or for individual frames or sets of frames of data. In other words, superframes could be defined to cover larger or smaller time intervals than one-second periods, or even variable time intervals.

Multiplex module 18 may provide feedback to encoder module 16, which in some cases, may include re-encode requests. In this way, multiplex module 18 can adjust the encoding rate applied to one or more specific channels by encoder module 16 in order to make efficient use of the available wireless bandwidth of wireless channels 15. Multiplex module 18 may analyze the encoded content and compare the amount of bandwidth needed to transmit such content to the available bandwidth on wireless channels 15. If needed, multiplex module 18 may issue one or more re-encode request to encoder module 16 to cause the coding rate to be reduced for one or more content streams. After multiplex module 18 creates the multicast, modulator 22 modulates the information according to a wireless physical layer modulation scheme. Transmitter 24 transmits the multicast to subscriber devices 12A-12C over wireless channels 15 via one or more antennas 28.

As described in greater detail below, encoder module 16 allocates multimedia data in a base layer and an enhancement layer provisioned for modulator 22 in the wireless modulation scheme. Reallocation module 25 analyzes the allocation of multimedia data between the base layer and the enhancement layer, and reallocates the multimedia data between the base layer and the enhancement layer based on the analysis. Modulator 22 modulates the reallocated multimedia data, and transmitter 24 transmits the reallocated multimedia data in the base layer and the enhancement layer according to the wireless modulation scheme. The reallocation of multimedia data by reallocation module 25 may help to efficiently utilize channel resources, balance bandwidth between channels, possibly improve error resilience at the application layer, and/or help to reduce overall aggregate bandwidth usage. Reallocation module 25 may comprise a sub-routine of encoder module 16 but is illustrated separately for simplicity. Indeed, the illustrated components of device 10 may be implemented in any combination of hardware, software and firmware, and any or all of the components or modules shown in FIG. 1 may be combined in a circuit or software routine.

Wireless channels 15 may operate according to any wireless protocol, and may have a fixed bandwidth. In other words, the amount of transmission channel resources available for transmitting the combined flows of multimedia data is limited. In the wireless context, the transmission channel resources may comprise air-link or air-interface resources. Thus, the number of bits that device 10 may transmit via channels 15 is limited by the amount of transmission channel resources available for the transmission. As examples, wireless channels 15 may operate according to one or more radio broadcast technologies such as FLO, DMB, or DVB-H, or according to one or more radio access technologies, such as Global System for Mobile Communications (GSM), code division multiple access (CDMA), CDMA 2000, wideband CDMA (W-CDMA), CDMA 1x Evolution-Data Optimized (EV-DO), frequency division multiple access (FDMA), orthogonal frequency division multiplexing (OFDM), time division multiple access (TDMA) or the broad family of standards developed to facilitate wireless networking defined by the various IEEE 801.11x standards.

In some aspects, the techniques described in this disclosure may be applied to H.264 Advanced Video Coding for delivering real-time video services in terrestrial mobile multimedia multicast (TM3) systems using the FLO Air Interface Specification, "Forward Link Only Air Interface Specification for Terrestrial Mobile Multimedia Multicast," to be published as Technical Standard TIA-1099 (the "FLO Specification"). That is to say, wireless channel 15 may comprise a wireless information channel used to broadcast wireless video information according to the FLO Specification, or the like. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital multimedia broadcasting).

Figure 2:
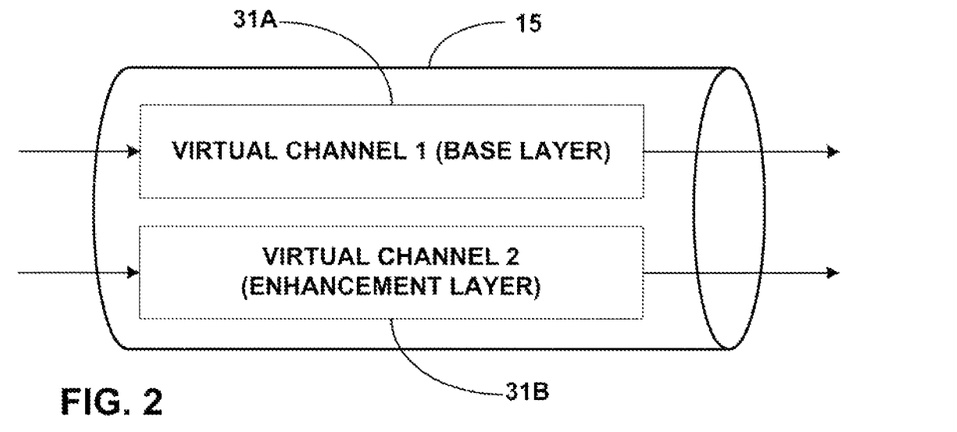
FIG. 2 is an illustration of wireless channels defined to include two different virtual channels.

Layered transmit modes (Mode Numbers $\in$ {6,7,8,9,10,11}) provisioned in the FLO Air Interface enable concurrent transmission and reception of two (potentially associated) information flows at two different service quality levels. This is achieved based on hierarchical modulation techniques and the structure of the signal constellation, the energy ratio, inner (Turbo) and outer (Reed-Solomon) code rates determine the relative reliabilities of these two virtual channels. FIG. 2 is an illustration of wireless channels 15 defined to include two different virtual channels (31A and 31B). At the physical layer, the modulation may actually comprise one modulation channel, but virtual channels 31A and 31B may be defined at the application layer.

In a typical application scenario, a high priority data stream, e.g., the base layer bitstream of a scalable video coder, is transmitted through the more reliable channel 31A and hence be provided a higher QoS. The lower significance data stream, e.g., the enhancement layer bitstream of the same scalable video coder, will be transmitted through the less reliable channel 31B and will consequently experience a lower QoS.

Figure 3:
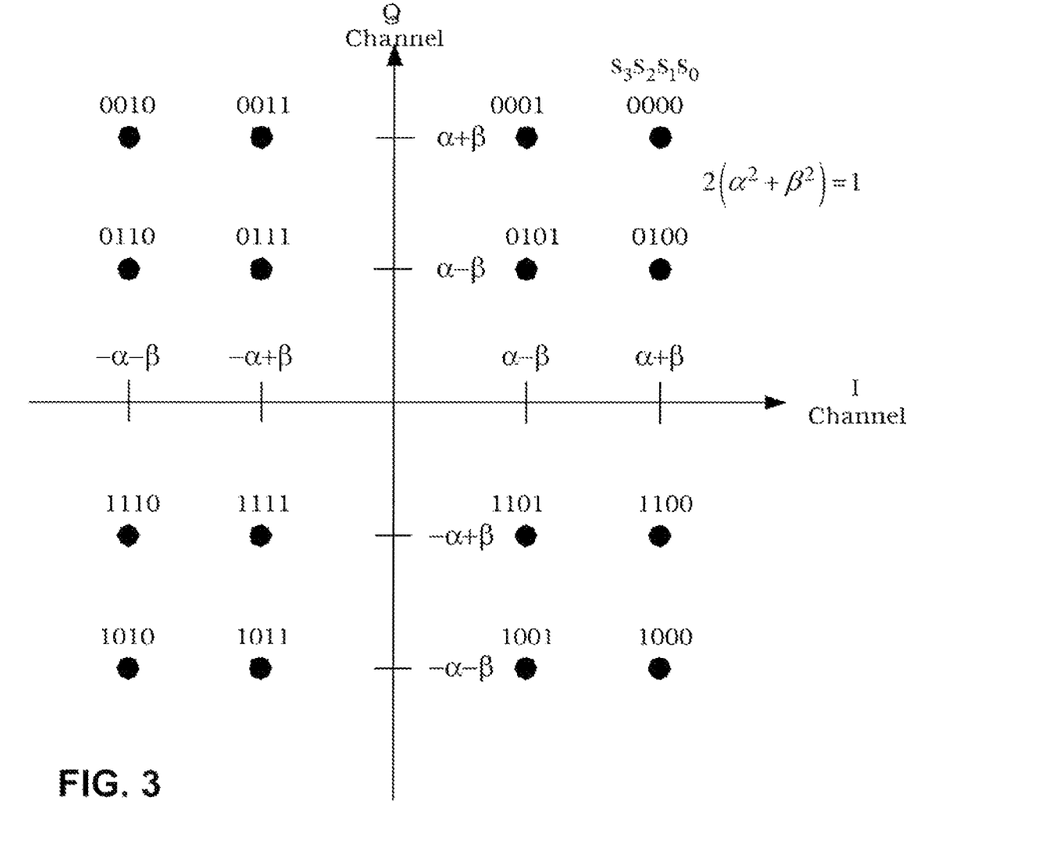
FIG. 3 is a diagram illustrating an exemplary signal constellation that may be used to code bits in a manner that defines a base layer and an enhancement layer.

With respect to the current revision of the FLO Air Interface specification, the available hierarchical signal constellation resembles that of 16-QAM as shown in FIG. 3. Each composite 4-bit binary number associated with each (signal) point in the constellation comprises 2 bits from each of the two data streams (base and enhancement). Again, the modulation defined at the physical layer may actually comprise one modulation channel, but several virtual channels may be defined at the application layer by assigning specific bits of the signal constellation (such as that shown in FIG. 3) to different layers. For example with respect to FIG. 3, within each quadrant the most significant (the left most) and the third most significant (third form the left) bits of each 4 bit binary number present in that quadrant have the same values which jointly are unique to that quadrant. Consequently, the combination of the first and the third most significant bit position values identifies the quadrant (the sub-cluster) of a received signal.

On the other hand, within each quadrant the second most significant (the second from the left) and the least significant (the first from the right) bits of each 4 bit binary number present in that quadrant jointly assume all of the (four) possible different values that enable these bit positions to be uniquely identified in a sub-cluster for a given received signal. Due to the constellation's structure (different inter-point distances), in the presence of signal contamination due to channel noise, false inter-sub-cluster signal transitions are much less likely to happen than false intra-sub-cluster signal transitions. Therefore, due to channel noise, it is much less likely to confuse a signal with another signal that belongs to a different sub-cluster than to confuse the same signal with another signal in the same sub-cluster, implying that the sub-cluster indicating most significant and third most significant bit positions are preserved against noise much better than the remaining two bit positions. Hence, with respect to FIG. 3, bit values for the most significant and the third most significant bit positions should be contributed by the base layer data, whereas the bit values for the second most significant and the least significant bit positions should be contributed by the enhancement layer data. Of course, many other signal constellations could be defined or used in accordance with this disclosure. The same Reed-Solomon code rate may be used for both data streams (base and enhancement), and a consequence is that, for each superframe, the bandwidths of both data streams should match.

In a conventional scenario, this bandwidth matching of channels 31A and 31B (corresponding to the base and enhancement layers) is achieved through the use of padding in the data stream of lesser bandwidth. In spite of the use of rate control algorithms, there is usually a considerable mismatch, which leads to wasted bandwidth.

The service qualities achieved by the two virtual channels 31A and 31B of layered transmit modes are quite different. A streaming video application expected to function over an unreliable channel needs to support certain features for satisfactory performance. One of these is the enabling of random access, i.e., a channel switch to change content, with acceptable latency. Another feature is Adaptive Intra Refresh (AIR), also known as Gradual Decoder Refresh (GDR), which aims to mitigate temporal error propagation in case of errors/losses. AIR/GDR can also be used as an effective tool for random access. Support for these two important features should typically be implemented and provided at the base layer transmitted over the more reliable channel. The base layer bitstream may need to meet essential requirements of quality in terms of spatial, temporal, and signal sample fidelity. The two features mentioned above may increase the bandwidth needs of the base layer. This can make the matching of bandwidths at the base and enhancement layers more challenging.

Two different Quality of Service (QoS) classes cause a two-level quantization of priority/significance for compressed data. A more flexible setting should allow for more than two service quality levels. One example design naturally leading to this need is described herein.

B slices or B frames provide an indispensable tool for compression efficiency. However, arbitrarily increasing the number of B frames or B slices is not an appropriate design for rate-distortion performance or for the matching of base and enhancement layer bandwidths through temporal scalability. The H.264/AVC standard allows "Generalized B Pictures" (denoted BR frames), which can serve as references for other B pictures in decoding order. Based on this provision, a GOP structure (in display order) can be considered as:

| I1 | B1 | BR1 | B2 | P1 | B3 | BR2 | B4 | P2 | B5 | BR3 | B6 | P3..., etc. |
|----|----|-----|----|----|----|-----|----|----|----|-----|----|----|

In the above, apart from the trivial numerical notation, BR* denotes Generalized B Pictures serving as references for regular B pictures. With respect to this GOP structure, it is possible to identify 3 (priority/significance) classes within the compressed data as follows:

Class 1. {I1, P1, P2, P3, . . . } providing 7.5 fps rendering assuming a 30 fps nominal temporal rate. Class 2. {BR1, BR2, BR3, . . . } providing 15 fps rendering in conjunction with Class 1.

Class 3. {B1, B2, B3, B4, B5, B6, . . } providing 30 fps rendering in conjunction with Classes 1 and 2. Again, I refers to "intra," P refers to "predictive" and B refers to "bi-directionally predictive."

It is easy to justify an arrangement in which Class 1 is allocated to the base layer and Class 3 is allocated into the enhancement layer. Considering Class 2, since BR frames serve as reference frames (partial) to frames in Class 3, Class 2 may logically deserve better protection than what is provided by the enhancement layer. Also, if, due to the nature of the content, 7.5 fps is not an adequate temporal rate, then this provides another motivation for moving Class 2 to the base layer. On the other hand, with both Class 1 and 2 in the base layer, achieving equal bandwidths at both layers will become more unlikely. Furthermore, since Class 1 serves as a reference to Class 2 (and Class 3), QoS provided to Class 1 should logically be better than that for Class 2. Hence, with respect to priority/significance Class 2 more accurately belongs to somewhere between the base and enhancement layers, which may not exist in systems that only have two layers (base and enhancement).

An overall design of the coding device is a challenging task. In such design, it is desirable to:
1. Avoid explicitly wasted bandwidth.
2. Enable bandwidth matching between base and enhancement layer data sets.
3. Be able to provide Unequal Error Protection (UEP) i.e. QoS, in more than 2 levels.
4. Improve error resilience.

These goals should be obtained in an efficient and standard compliant manner.

The techniques of this disclosure may distinguish between the cases of excess bandwidth in the base layer and excess bandwidth in the enhancement layer. The case of excess bandwidth in the enhancement layer is much more benign than the alternate imbalance. In the case of excess bandwidth in the enhancement layer, instead of padding the base layer, a portion of the excess multimedia data in the enhancement layer can be moved to the base layer. This can provide a higher quality of service (QoS) to the relocated data than the enhancement layer. This can also lead to reduced overall bandwidth for the combined flow. Transport and Sync Layer framing/packetization provisions can be used to signal and manage this type of data shuffling.

The techniques described below concentrate on resolutions to the more practical problem in which a straightforward partitioning of coded multimedia data e.g., video access units (VAUs), leads to a higher bandwidth in the base layer. This is a serious problem since moving multimedia data from the more reliable channel to the less reliable channel is not feasible in most cases, and moving multimedia data from the more reliable channel to the less reliable channel is not a trivial task.

The techniques of this disclosure may assume that a full re-encode in order to achieve a better match between base and enhancement layer bandwidths is not possible, or at least undesirable. Under these assumptions, i.e., base layer bandwidth is greater than enhancement layer bandwidth, and a full re-encode is not an option, the discussion below focuses on some specific cases. Different courses of action are proposed for a coding device to efficiently alleviate the imbalance between base and enhancement layers. In the following cases, it may be assumed that encoder module 16 has made a (preliminary) allocation of compressed multimedia information to the base and enhancement layers defined in a wireless modulation scheme. Reallocation module 25 analyzes the allocation of multimedia data between the base layer and the enhancement layer, and reallocates the multimedia data between the base layer and the enhancement layer based on the analysis. This reallocation may occur according to the different cases addressed below. Following the reallocation, transmitter 24 may transmit the reallocated multimedia data in the base layer and the enhancement layer according to the wireless modulation scheme.

In CASE 1, there is no multimedia data in the base layer immediately amenable to being reallocated in the enhancement layer and multiplex module 18 has not requested a bandwidth adjustment (reduction) for the current superframe. B frames may be considered to be frames that are immediately amenable to being reallocated in the enhancement layer. Thus, in CASE 1 there may be no B frames allocated to the base layer. In CASE 1, there may be an incentive to preserve the base layer bandwidth as it is and put the spare bandwidth available in the enhancement layer to good use for improved error resilience. Some foreseeable options include the following.

In one example, CASE 1 could lead to redundant representations of a select subset of slices of the base layer into the enhancement layer. The redundant representations do not have to be at the same quality level provided by the base layer. Actually, noting that base layer I and P slices typically consume considerably higher bandwidth than enhancement layer B slices, in order to make more efficient use of the spare bandwidth available, it may be desirable to utilize a coarser (lower quality) redundant rendition of I and P slices in the enhancement layer. On the other hand, it may be undesirable to burden the coding device with the additional task of generating this alternate representation. A standard compliant solution to this dilemma can be achieved through the use of Slice Data Partitioning (SDP).

In particular, SDP may be utilized as an efficient, simple and effective SNR scalability aid in conjunction with the core temporal scalability framework. Hence, redundant copies of select partitions (potentially A and B partitions) of select slices of select base layer VAUs can be provided in the spare enhancement layer bandwidth. In order to provide only one additional (redundant) representation, the "redundant coded picture/slice" provision in H.264/AVC can be utilized.

In SDP, coded multimedia data is divided into different partitions. According to ITU-T H.264, I frames (or slices) can have up to two partitions (A and B), and B and P frames (or slices) can have up to three partitions (A, B and C). Part A partitions include the most important information such as slice header information, macroblock (MB) types, intra prediction modes and the motion vectors used in the coding. Part B partitions include the residual information for Intra MBs. Part C partitions include the residual information for Inter MBs. Employing SDP in conjunction with Raw Byte Sequence Payload (RBSP) syntax (H.264 Annex B) necessitates the use of typically 4 additional bytes (3 start-code prefix bytes and 1 NALU header byte) per each B and C partition. This overhead figure may be increased by 1 more byte per each B and C partition due to RBSP trailing bits. For redundant coding, the most important information (Part A partitions) may be given priority for redundant coding in both the base layer and the enhancement layer. Also, as described in greater detail below, if multimedia data needs to be moved from the base layer to the enhancement layer, the part C partition information defined in an SDP scheme may provide a good candidate to be moved since its priority is lowest of the three different partitions for P and B frames.

As another example, CASE 1 could lead to redundant representations of a select subset of partial or entire video access units (VAUs) and/or slices in the enhancement layer. Noting that, statistically, the B VAU/slice sizes are small typically a few tens of bytes, it is sometimes inefficient to utilize SDP in B slices, especially in B VAUs with multiple slices. Hence, in this case, redundant representations may be provided by exact copies of select unpartitioned B VAUs and/or B slices being coded in the enhancement layer. However, not all B VAUs are equally important. When they are present, BR VAUs are of higher priority and significance compared to regular (non-reference) B VAUs. Within regular B VAUs, those enabling the sampling of temporal segments with higher motion content are more significant compared to the remaining B VAUs. These criteria can be used to decide which B VAUs should be redundantly represented in the enhancement layer (starting with BRs when they are present).

It should be noted that redundant representations in this context provides an efficient mechanism for Unequal Error Protection (UEP) of BR VAUs and other desired data. Since B VAU/slice sizes are small, more than one additional (redundant) representation for B VAUs/slices can be provided. Beyond the already permissible one redundant coded picture provisioned by the H.264 standard, a standard compliant way of achieving multiple redundant representations is through the use of a "user_data_unregistered" Supplemental Enhancement Information (SEI) message type. Assuming the redundant transmission of an odd (≥3) number of copies of the same data altogether, including both the original and redundant (exact) copies, the decoding device may execute a "majority decoding" scheme when all received copies are questionable or all received copies originate from residually erased Physical Layer Packets (PLPs). A fundamental prerequisite for this approach is that a video decoding layer should be capable of gracefully handling erroneous data. The repetition code realized within an enhancement layer data set can elevate the transmission reliability of the data segments that are redundantly coded.

The transmission-instant diversity (in time) experienced by the plural copies of redundant data can increase the probability that at least one of the copies will be received intact in spite of channel impairments. Here, as a final point, it should be noted that the proposal of introducing redundancy within the same layer, i.e., the enhancement layer, providing the same reliability (QoS), stands out as a more intuitive and potent approach compared to introducing redundancy in different layers.

Another option for CASE 1 is to code and transmit assistance information (i.e., decoding hints) in the excess enhancement layer bandwidth to assist the decoder in its error handling and concealment. As an alternative to, or in addition to redundant multimedia data transmission, device 10 may consider the inclusion of information to aid in error handling and concealment, which can support the decoder as the decoder deals with channel impairments. These assistance information may allow for better informed decision making in the decoder for handling erroneous as well as non-erroneous VAU data, such as "skip & freeze," and "decode & conceal" actions. In addition, such assistance information could help the decoder choose the most appropriate (content and loss structure dependent) concealment methodology.

Assistance information can be in the form of superframe (SF) structure descriptions, B VAU locations, temporal (uni-directional and bi-directional) similarity metrics, scene-change/shot-boundary indicators, global motion descriptors, intra-slice resynchronization point descriptors, Spatial Error Concealment (SEC) and Temporal Error Concealment (TEC) support information such as intra prediction modes, mean luminance and chrominance values, and motion vectors for nontrivial/complex motion field segments.

In addition to assistance information for the current SF, transmission of assistance information for another SF interval, i.e., the previous and/or the next SF interval may also be used. This can benefit from increased time diversity. Although it is not desirable to increase processing delays in either the encoder or the decoder, with the choice of adequately simple metrics and careful packetization, any resulting latencies can be easily controlled at both the encoder and the decoder.

In CASE 2, there is no multimedia data in the base layer immediately amenable to being reallocated in the enhancement layer and multiplex module 18 has already requested a bandwidth adjustment (reduction) for the current superframe. Again, B frames may be considered to be frames that are immediately amenable to being reallocated in the enhancement layer. Thus, in CASE 2, there may be no B frames allocated to the base layer, and multiplex module 18 has already requested a bandwidth adjustment (reduction) for the current superframe.

Under these CASE 2 circumstances, any bias in encoder processing should be toward reducing the base layer bandwidth. However, when only I and P VAUs are included in the base layer, this base layer bandwidth reduction is nontrivial. One solution for efficiently realizing a reduction in the bandwidth of the base layer is based on simple SNR scalability through SDP. Starting with the last P VAU of the superframe, part C partitions of select P slices/frames can be moved to the enhancement layer. Commencing this process at the end of the superframe in the base layer (and moving towards the beginning of the superframe to the extent necessary) helps to confine any undesirable reconstruction drift that will result if the enhancement layer is lost. Through this backward (from-the-end-toward-the-beginning) processing order, reconstruction drift due to enhancement layer data loss can be confined to the minimum time span within the current superframe. Commencing this process at the end of the current superframe in the base layer can also enable a quick benefit from the AIR/GDR in the following SF(s) for controlling the temporal propagation of the drift.

According to this CASE 2 approach, part A partitions and part B partitions should be preserved in the base layer.

Beyond what is feasibly possible through any reallocation of part C partitions (from base to enhancement), any remaining mismatch between the base and enhancement layer bandwidths and the corresponding spare bandwidth in the enhancement layer can be addressed through using one of the approaches outlined for CASE 1.

In CASE 3, there is multimedia data in the base layer immediately amenable to being reallocated in the enhancement layer and multiplex module 18 has not requested a bandwidth adjustment (reduction) for the current superframe. Thus, in CASE 3, there are B frames (such as BR frames) allocated to the base layer, and multiplex module 18 has not requested a bandwidth adjustment (reduction) for the current superframe.

In this CASE 3, there is seemingly an incentive to preserve the base layer bandwidth as there is no bandwidth reduction request from the multiplex module 18, and put the spare bandwidth present in the enhancement layer to good use through one or more of the proposals outlined for CASE 1. However, based on the utmost importance of efficient bandwidth usage, the coding device should assess the feasibility of reducing base layer bandwidth. A principle enabler towards this end is that not all B/BR frames are equally important. This is true, in particular, for uniform GOP structures utilizing B/BR frames. With adaptive GOP (also known as non-uniform GOP) structures, non-uniform motion content of a video sequence and the corresponding opportunity for non-uniform temporal sampling may already be taken into account.

In CASE 3, the first option may be to move normal B frames (non-reference B frames) from the base layer to the enhancement layer. Non-reference B frames, however, are typically not included in the base layer. Starting with BR frames (reference B frames), sampling temporal segments with the lowest motion content, BR frame data can be moved to the enhancement layer. In this process, to provide these BR frames with error protection that is better than nominal in the enhancement layer, redundancy can be provided at the enhancement layer. That is, BR frames that are reallocated from the base layer to the enhancement layer may be coded in a redundant fashion in the enhancement layer. BR frames deemed 'essential/more significant' for the basic quality temporal rendering of the video sequence should still be preserved in the base layer.

In CASE 4, there is multimedia data in the base layer immediately amenable to being reallocated in the enhancement layer and multiplex module 18 has already requested a bandwidth adjustment (reduction) for the current superframe. Thus, in CASE 4 there are B frames (such as BR frames) allocated to the base layer, and multiplex module 18 has already requested a bandwidth adjustment (reduction) for the current superframe.

Under CASE 4 circumstances, the bias in processing should be toward reducing the base layer bandwidth. In line with CASE 3, the first option may be to move normal B frames (non-reference B frames) from base layer to enhancement layer. Also, in line with CASE 3, starting with BR frames of lesser significance, the data of select BR frames can be moved to the enhancement layer with redundancy provisioning in the enhancement layer, if feasible. In this case, the focus is primarily on lowering the base layer bandwidth requirement and then matching base and enhancement layer bandwidths. It is hard to make error resilience improvement an immediate goal in this case.

Figure 4:
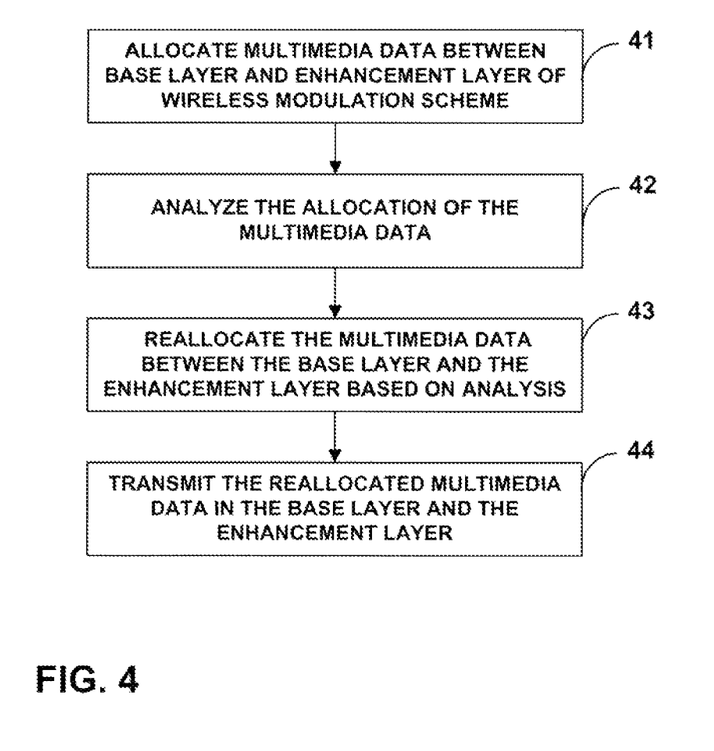
FIGS. 4-5 are flow diagrams illustrating exemplary techniques for allocating and reallocating multimedia data between a base layer and an enhancement layer consistent with this disclosure.

FIG. 4 is a flow diagram illustrating a technique consistent with this disclosure. As shown in FIG. 4, encoder module 16 allocates multimedia data between a base layer and an enhancement layer defined in a wireless modulation scheme (41). Reallocation module 25 then analyzes the allocation of multimedia data between the base layer and the enhancement layer (42), and reallocates the multimedia data between the base layer and the enhancement layer based on the analysis (43). Transmitter 24 transmits the reallocated multimedia data in the base layer and the enhancement layer according to the wireless modulation scheme (44), e.g., over wireless channels 15 to various subscriber devices 12A-12C. Modulator 22 may perform the modulation (as defined by the allocation and reallocations defined by encoder module 16 and reallocation module 25) prior to transmission of the multimedia data by transmitter 24.

As described in greater detail above, encoder module 16 may allocate the multimedia data between the base layer and the enhancement layer according to a slice data partitioning scheme. In this case, reallocation module 25 reallocates the multimedia data between the base layer and the enhancement layer according to the slice data partitioning scheme. For example, reallocation module 25 may move a subset of slice data partitions associated with one or more multimedia frames from the base layer to the enhancement layer. Type C partitions of P frames, for example, may be moved when there are no B frames in the base layer. According to slice data partitioning, I frames can define two levels of partition (Type A and Type B partitions), and P and B frames can define three levels of partition (Type A, Type B and Type C partitions).

In some cases, encoder module 16 may assign I frames and P frames to the base layer, and may assign B frames to the enhancement layer. In other cases, encoder module 16 may assign I frames and P frames to the base layer, assign a first subset of B frames to the base layer, and assign a second subset of B frames to the enhancement layer. The analysis performed by reallocation module 25 may include a determination of whether there are B frames in the base layer. The analysis may also include a determination of whether multiplex module 18 has issued any re-encode requests to encoder module 16.

In one example, reallocation module 25 determines whether a re-encode request has been issued with respect to the allocated multimedia data, and reallocates the multimedia data between the base layer and the enhancement layer based at least in part on whether a re-encode request has been issued. Furthermore, reallocation module 25 may determine whether there are B frames in the base layer, and reallocate the multimedia data between the base layer and the enhancement layer based at least in part on whether there are B frames in the base layer.

Figure 5:
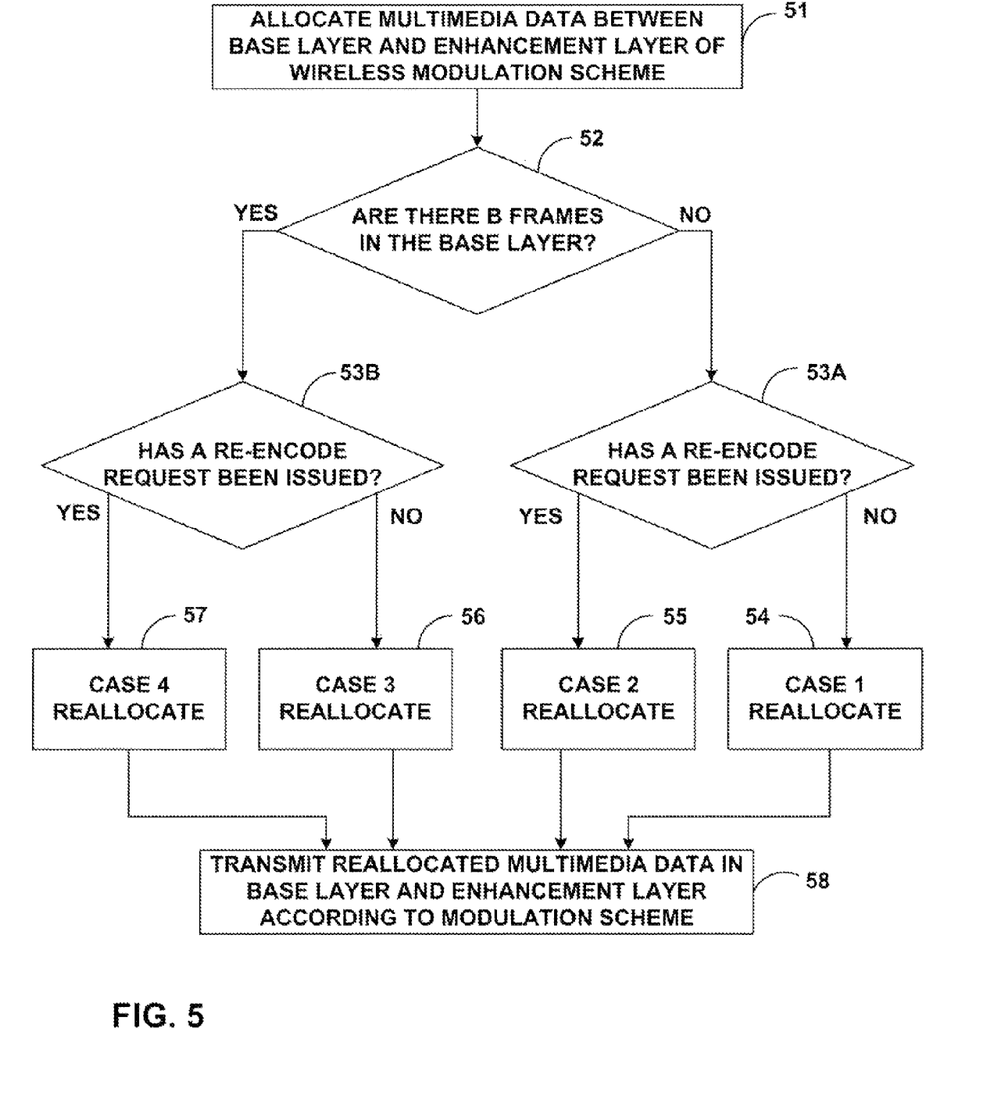

FIG. 5 is another flow diagram illustrating a technique consistent with this disclosure. As shown in FIG. 5, encoder module 16 allocates multimedia data between a base layer and an enhancement layer defined in a wireless modulation scheme (51). Reallocation module 25 then analyzes the allocation of multimedia data between the base layer and the enhancement layer to determine whether there are B frames in the base layer (52) and whether a re-encode request has been issued (53A and 53B). Reallocation module 25 then reallocates the multimedia data between the base layer and the enhancement layer based on these factors, e.g., according to CASE 1 (54), CASE 2 (55), CASE 3 (56) or CASE 4 (57).

For example, when there are no B frames in the base layer (no branch of 52) and a re-encode request has not been issued (no branch of 53A), reallocation module 25 may redundantly allocate one or more copies of a subset of information in the base layer into the enhancement layer. This is one possibility for CASE 1 (54). The redundant allocation of one or more copies of a subset of information in the base layer may be performed on a frame basis, a slice basis, or a slice data partition basis. The most important frames, slices or slice data partitions are the best candidates for redundant allocation according to CASE 1 because the data remains in the base layer and is coded redundantly in the enhancement layer for added data security.

Alternatively, when there are no B frames in the base layer (no branch of 52) and a re-encode request has not been issued (no branch of 53A), reallocation module 25 may code assistance information into the enhancement layer, the assistance information providing assistance to a decoder for error handing. This is an alternative possibility for CASE 1 (54). A number of possible assistance information are listed above.

When there are no B frames in the base layer (no branch of 52) and a re-encode request has been issued (yes branch of 53A), reallocation module 25 moves a portion of one or more predictive (P) frames originally in the base layer to the enhancement layer. This is CASE 2 (55). In particular, in CASE 2 the movement of a portion of P frames may involve moving part C partitions (defined by slice data partitioning) of P frames from the base layer to the enhancement layer. The later P frames (later in time) within a given superframe should be moved first. If desired, redundancy may be provisioned such that any data moved from the base layer to the enhancement layer is coded redundantly in the enhancement layer for enhanced reliability.

When there are B frames in the base layer (yes branch of 52) and a re-encode request has not been issued (no branch of 53B), reallocation module 25 may assess the B frames in the base layer to identify less significant B frames and more significant B frames, and move one or more of the less significant B frames originally in the base layer to the enhancement layer. The disclosure above provides one methodology for prioritizing different B frames, although other methodologies could be used. In this case, i.e., CASE 3 (56), reallocation module 25 may code the less significant B frames in the enhancement layer in a redundant fashion. That is, any B frames moved from the base layer to the enhancement layer may be coded in a redundant fashion in the enhancement layer.

When there are B frames in the base layer (yes branch of 52) and a re-encode request has been issued (yes branch of 53B), reallocation module 25 assesses the B frames in the base layer to identify less significant B frames and more significant B frames, moves one or more of the less significant B frames originally in the base layer to the enhancement layer. This case is CASE 4 (57). Again, the disclosure above provides an example methodology for prioritizing different B frames, although other methodologies could be used. As with CASE 3, with CASE 4, any B frames moved from the base layer to the enhancement layer may be coded in a redundant fashion in the enhancement layer.

Once multimedia data is reallocated, transmitter 24 transmits the reallocated multimedia data in the base layer and the enhancement layer (58), e.g., according to the wireless modulation scheme. In this manner, the multimedia data is transmitted over wireless channels 15 to various subscriber devices 12A-12C. The allocation and reallocation techniques described herein may help to efficiently utilize channel resources, balance bandwidth between channels and possibly improve error resilience at the application layer.

Based on the teachings described herein, one skilled in the art should appreciate that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise RAM, such as synchronous dynamic random access memory (SDRAM), read-only memory (ROM), non-volatile random access memory (NVRAM), programmable read-only memory PROM, erasable programmable read-only memory (EPROM), electrically erasable programmable read-only memory (EEPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

Also, any connection is properly termed a computer-readable medium. For example, if the software is transmitted from a website, server, or other remote source using a network cable, coaxial cable, fiber optic cable, twisted pair, digital subscriber line (DSL), or wireless technologies such as infrared, radio, and microwave, then the network cable, coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

A computer program product, as disclosed herein, includes a computer-readable medium as well as any materials associated with the computer-readable medium, including packaging materials within which the computer-readable medium is packaged. The code associated with a computer-readable medium of a computer program product may be executed by a computer, e.g., by one or more processors, such as one or more digital signal processors (DSPs), general purpose microprocessors, ASICs, FPGAs, or other equivalent integrated or discrete logic circuitry. In some aspects, the functionality described herein may be provided within dedicated software modules or hardware modules configured for encoding, decoding, modulating and transmitting data, or incorporated in a combined CODEC and wireless modulator/transmitter.

Various aspects have been described. These and other aspects are within the scope of the following claims.

What is claimed is:

1. A method comprising:
    allocating multimedia data between a base layer and an enhancement layer defined in a wireless modulation scheme;
    analyzing the allocation of the multimedia data between the base layer and the enhancement layer;
    reallocating the multimedia data between the base layer and the enhancement layer based on the analysis, wherein the reallocating comprises at least one of reallocating multimedia data allocated to the base layer to the enhancement layer or reallocating multimedia data allocated to the enhancement layer to the base layer; and transmitting the reallocated multimedia data in the base layer and the enhancement layer of the wireless modulation scheme, wherein: analyzing the allocation of the multimedia data includes determining whether a re-encode request has been issued with respect to the allocated multimedia data; and reallocating the multimedia data includes reallocating the multimedia data between the base layer and the enhancement layer based at least in part on whether a re-encode request has been issued.

2. A method comprising:

allocating multimedia data between a base layer and an enhancement layer defined in a wireless modulation scheme;

analyzing the allocation of the multimedia data between the base layer and the enhancement layer;

reallocating the multimedia data between the base layer and the enhancement layer based on the analysis; and transmitting the reallocated multimedia data in the base layer and the enhancement layer of the wireless modulation scheme;

wherein: allocating the multimedia data comprises allocating the multimedia data between the base layer and the enhancement layer according to a slice data partitioning scheme; and reallocating the multimedia data comprises reallocating the multimedia data between the base layer and the enhancement layer according to the slice data partitioning scheme such that in reallocating the multimedia data, a sub-set of slice data partitions associated with one or more multimedia frames is moved from the base layer to the enhancement layer, wherein: analyzing the allocation of the multimedia data includes determining whether a re-encode request has been issued with respect to the allocated multimedia data; and reallocating the multimedia data includes reallocating the multimedia data between the base layer and the enhancement layer based at least in part on whether a re-encode request has been issued.

3. The method of claim 2, wherein allocating the multimedia data comprises:

assigning intra (I) frames and predictive (P) frames to the base layer; and assigning bidirectional predictive (B) frames to the enhancement layer.

4. The method of claim 3, wherein: the I frames define two levels of partition; and the P and B frames define three levels of partition.

5. The method of claim 2, wherein allocating the multimedia data comprises:

assigning intra (I) frames and predictive (P) frames to the base layer;

assigning a first subset of bi-directional predictive (B) frames to the base layer; and assigning a second subset of B frames to the enhancement layer.

6. The method of claim 1, wherein: analyzing the allocation of the multimedia data includes determining whether there are bi-directional predictive (B) frames in the base layer; and reallocating the multimedia data includes reallocating the multimedia data between the base layer and the enhancement layer based at least in part on whether there are B frames in the base layer.

7. The method of claim 6, wherein when there are no B frames in the base layer and a re-encode request has not been issued, reallocating the multimedia data includes: redundantly allocating a subset of information in the base layer into the enhancement layer.

8. The method of claim 6, wherein when there are no B frames in the base layer and a re-encode request has not been issued, reallocating the multimedia data includes: coding assistance information into the enhancement layer, the assistance information providing assistance to a decoder for error handing.

9. The method of claim 6, wherein when there are no B frames in the base layer and a re-encode request has been issued, reallocating the multimedia data includes: moving a portion of one or more predictive (P) frames originally in the base layer to the enhancement layer.

10. The method of claim 6, wherein when there are B frames in the base layer and a re-encode request has not been issued, reallocating the multimedia data includes:

assessing the B frames in the base layer to identify less significant B frames and more significant B frames; and moving one or more of the less significant B frames originally in the base layer to the enhancement layer.

11. The method of claim 10, wherein reallocating the multimedia data further includes: coding the less significant B frames in the enhancement layer in a redundant fashion.

12. The method of claim 6, wherein when there are B frames in the base layer and a re-encode request has been issued, reallocating the multimedia data includes:

assessing the B frames in the base layer to identify less significant B frames and more significant B frames; and moving one or more of the less significant B frames originally in the base layer to the enhancement layer.

13. The method of claim 12, wherein reallocating the multimedia data further includes: coding the less significant B frames in the enhancement layer in a redundant fashion.

14. The method of claim 1, further comprising: modulating the reallocated multimedia data in the base layer and the enhancement layer of the wireless modulation scheme prior to transmitting the reallocated multimedia data.

15. An apparatus comprising:

an encoder software module that allocates multimedia data between a base layer and an enhancement layer defined in a wireless modulation scheme;

a reallocation software module that analyzes the allocation of multimedia data between the base layer and the enhancement layer, and reallocates the multimedia data between the base layer and the enhancement layer based on the analysis; and a transmitter that transmits the reallocated multimedia data in the base layer and the enhancement layer according to the wireless modulation scheme:

wherein the reallocation software module:

determines whether a re-encode request has been issued with respect to the allocated multimedia data; and reallocates the multimedia data between the base layer and the enhancement layer based at least in part on whether a re-encode request has been issued.

16. The apparatus of claim 15, wherein:

the encoder software module further allocates the multimedia data between the base layer and the enhancement layer according to a slice data partitioning scheme; and the reallocation software module further reallocates the multimedia data between the base layer and the enhancement layer according to the slice data partitioning scheme, such that in reallocating the multimedia data, the software reallocation module further moves a sub-set of slice data partitions associated with one or more multimedia frames from the base layer to the enhancement layer.

17. The apparatus of claim 16, wherein the encoder software module further:
assigns intra (I) frames and predictive (P) frames to the base layer; and
assigns bi-directional predictive (B) frames to the enhancement layer.

18. The apparatus of claim 17, wherein:
the I frames define two levels of partition; and
the P and B frames define three levels of partition.

19. The apparatus of claim 16, wherein the encoder software module further:
assigns intra (I) frames and predictive (P) frames to the base layer;
assigns a first subset of bi-directional predictive (B) frames to the base layer; and
assigns a second subset of B frames to the enhancement layer.

20. The apparatus of claim 15, wherein the reallocation software module further:
determines whether there are bi-directional predictive (B) frames in the base layer; and
reallocates the multimedia data between the base layer and the enhancement layer based at least in part on whether there are B frames in the base layer.

21. The apparatus of claim 20, wherein when there are no B frames in the base layer and a re-encode request has not been issued, the reallocation software module further: redundantly allocates a subset of information in the base layer into the enhancement layer.

22. The apparatus of claim 20, wherein when there are no B frames in the base layer and a re-encode request has not been issued, the reallocation software module further: codes assistance information into the enhancement layer, the assistance information providing assistance to a decoder for error handing.

23. The apparatus of claim 20, wherein when there are no B frames in the base layer and a re-encode request has been issued, the reallocation software module further:
moves a portion of one or more predictive (P) frames originally in the base layer to the enhancement layer.

24. The apparatus of claim 20, wherein when there are B frames in the base layer and a re-encode request has not been issued, the reallocation software module further:
assesses the B frames in the base layer to identify less significant B frames and more significant B frames; and
moves one or more of the less significant B frames originally in the base layer to the enhancement layer.

25. The apparatus of claim 24, wherein the reallocation software module further: codes the less significant B frames in the enhancement layer in a redundant fashion.

26. The apparatus of claim 20, wherein when there are B frames in the base layer and a re-encode request has been issued, the reallocation software module further:
assesses the B frames in the base layer to identify less significant B frames and more significant B frames; and
moves one or more of the less significant B frames originally in the base layer to the enhancement layer.

27. The apparatus of claims 26, wherein the reallocation software module further: codes the less significant B frames in the enhancement layer in a redundant fashion.

28. The apparatus of claim 15, further comprising:
a software modulator that modulates the reallocated multimedia data in the base layer and the enhancement layer of the wireless modulation scheme.

29. A device comprising:
a processor connected to a memory, wherein the processor is configured to at least perform steps of the following:
allocating multimedia data between a base layer and an enhancement layer defined in a wireless modulation scheme;
analyzing the allocation of the multimedia data between the base layer and the enhancement layer;
reallocating the multimedia data between the base layer and the enhancement layer based on the analysis; and
transmitting the reallocated multimedia data in the base layer and the enhancement layer of the wireless modulation scheme,
wherein: the analyzing determines whether a re-encode request has been issued with respect to the allocated multimedia data; and the reallocating the multimedia data reallocates the multimedia data between the base layer and the enhancement layer based at least in part on whether a re-encode request has been issued.

30. The device of claim 29, wherein: the allocating allocates the multimedia data between the base layer and the enhancement layer according to a slice data partitioning scheme; and the reallocating reallocates the multimedia data between the base layer and the enhancement layer according to the slice data partitioning scheme such that in reallocating the multimedia data, a sub-set of slice data partitions associated with one or more multimedia frames is moved from the base layer to the enhancement layer.

31. The device of claim 30, wherein the allocating: assigns intra (I) frames and predictive (P) frames to the base layer; and assigns bidirectional predictive (B) frames to the enhancement layer.

32. The device of claim 31, wherein:
the I frames define two levels of partition; and
the P and B frames define three levels of partition.

33. The device of claim 30, wherein the allocating:
assigns intra (I) frames and predictive (P) frames to the base layer; assigns a first subset of bi-directional predictive (B) frames to the base layer; and assigns a second subset of B frames to the enhancement layer.

34. The device of claim 29, wherein: the analyzing determines whether there are bi-directional predictive (B) frames in the base layer; and the reallocating the multimedia data reallocates the multimedia data between the base layer and the enhancement layer based at least in part on whether there are B frames in the base layer.

35. The device of claim 34, wherein when there are no B frames in the base layer and a re-encode request has not been issued, the reallocating the multimedia data: redundantly allocates a subset of information in the base layer into the enhancement layer.

36. The device of claim 34, wherein when there are no B frames in the base layer and a re-encode request has not been issued, the reallocating the multimedia data: codes assistance information into the enhancement layer, the assistance information providing assistance to a decoder for error handing.

37. The device of claim 34, wherein when there are no B frames in the base layer and a re-encode request has been issued, the reallocating the multimedia data: moves a portion of one or more predictive (P) frames originally in the base layer to the enhancement layer.

38. The device of claim 34, wherein when there are B frames in the base layer and a re-encode request has not been issued, the reallocating the multimedia data:
assesses the B frames in the base layer to identify less significant B frames and more significant B frames; and
moves one or more of the less significant B frames originally in the base layer to the enhancement layer.

39. The device of claim 34, wherein the reallocating the multimedia data:
codes the less significant B frames in the enhancement layer in a redundant fashion.

40. The device of claim 34, wherein when there are B frames in the base layer and a re-encode request has been issued, the reallocating the multimedia data:
assesses the B frames in the base layer to identify less significant B frames and more significant B frames; and
moves one or more of the less significant B frames originally in the base layer to the enhancement layer.

41. The device of claim 40, wherein the reallocating the multimedia data:
codes the less significant B frames in the enhancement layer in a redundant fashion.

42. The device of claim 39, further comprising: modulating the reallocated multimedia data in the base layer and the enhancement layer of the wireless modulation scheme.

43. A computer-program product storing a non-transitory computer readable storage medium comprising instructions that cause at least one computer to:
allocate multimedia data between a base layer and an enhancement layer defined in a wireless modulation scheme;
analyze the allocation of the multimedia data between the base layer and the enhancement layer;
reallocate the multimedia data between the base layer and the enhancement layer based on the analysis; and
transmit the reallocated multimedia data in the base layer and the enhancement layer of the wireless modulation scheme,
wherein: analyzing the allocation of the multimedia data includes determining whether a re-encode request has been issued with respect to the allocated multimedia data; and reallocating the multimedia data includes reallocating the multimedia data between the base layer and the enhancement layer based at least in part on whether a re-encode request has been issued.

44. The computer-program product of claim 43, wherein the instructions cause the computer to:
allocate the multimedia data between the base layer and the enhancement layer according to a slice data partitioning scheme; and
reallocate the multimedia data between the base layer and the enhancement layer according to the slice data partitioning scheme such that in reallocating the multimedia data, a sub-set of slice data partitions associated with one or more multimedia frames is moved from the base layer to the enhancement layer.

45. The computer-program product of claim 44, wherein allocating the multimedia data includes:
assigning intra (I) frames and predictive (P) frames to the base layer; and
assigning bi-directional predictive (B) frames to the enhancement layer.

46. The computer-program product of claim 45, wherein:
the I frames define two levels of partition; and
the P and B frames define three levels of partition.

47. The computer-program product of claim 44, wherein allocating the multimedia data includes:
assigning intra (I) frames and predictive (P) frames to the base layer;
assigning a first subset of bi-directional predictive (B) frames to the base layer; and
assigning a second subset of B frames to the enhancement layer.

48. The computer-program product of claim 43, wherein: analyzing the allocation of the multimedia data includes determining whether there are bi-directional predictive (B) frames in the base layer; and reallocating the multimedia data includes reallocating the multimedia data between the base layer and the enhancement layer based at least in part on whether there are B frames in the base layer.

49. The computer-program product of claim 48, wherein when there are no B frames in the base layer and a re-encode request has not been issued, reallocating the multimedia data includes: redundantly allocating a subset of information in the base layer into the enhancement layer.

50. The computer-program product of claim 48, wherein when there are no B frames in the base layer and a re-encode request has not been issued, reallocating the multimedia data includes: coding assistance information into the enhancement layer, the assistance information providing assistance to a decoder for error handing.

51. The computer-program product of claim 48, wherein when there are no B frames in the base layer and a re-encode request has been issued, reallocating the multimedia data includes: moving a portion of one or more predictive (P) frames originally in the base layer to the enhancement layer.

52. The computer-program product of claim 48, wherein when there are B frames in the base layer and a re-encode request has not been issued, reallocating the multimedia data includes:
assessing the B frames in the base layer to identify less significant B frames and more significant B frames; and
moving one or more of the less significant B frames originally in the base layer to the enhancement layer.

53. The computer-program product of claim 52, wherein reallocating the multimedia data further includes: coding the less significant B frames in the enhancement layer in a redundant fashion.

54. The computer-program product of claim 48, wherein when there are B frames in the base layer and a re-encode request has been issued, reallocating the multimedia data includes:
assessing the B frames in the base layer to identify less significant B frames and more significant B frames; and
moving one or more of the less significant B frames originally in the base layer to the enhancement layer.

55. The computer-program product of claim 54, wherein reallocating the multimedia data further includes: coding the less significant B frames in the enhancement layer in a redundant fashion.

56. The computer-program product of claim 43, wherein the instructions cause the computer to: modulate the reallocated multimedia data in the base layer and the enhancement layer of the wireless modulation scheme.

* * * * *